United States Patent
McNew

(10) Patent No.: US 10,112,611 B2
(45) Date of Patent: Oct. 30, 2018

(54) ADAPTIVE VEHICLE CONTROL SYSTEMS AND METHODS OF ALTERING A CONDITION OF A VEHICLE USING THE SAME

(71) Applicant: Toyota Motor Engineering & Manufacturing North America, Inc., Erlanger, KY (US)

(72) Inventor: John-Michael McNew, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 57 days.

(21) Appl. No.: 15/218,859

(22) Filed: Jul. 25, 2016

(65) Prior Publication Data

US 2018/0022350 A1 Jan. 25, 2018

(51) Int. Cl.
*B60W 30/16* (2012.01)
*G05D 1/00* (2006.01)
*G05D 1/02* (2006.01)
*B60W 30/12* (2006.01)
*G08G 1/017* (2006.01)
*G08G 1/16* (2006.01)

(52) U.S. Cl.
CPC ......... *B60W 30/162* (2013.01); *B60W 30/12* (2013.01); *G05D 1/0088* (2013.01); *G05D 1/0221* (2013.01); *G05D 1/0223* (2013.01); *G08G 1/163* (2013.01); *G08G 1/167* (2013.01); *B60W 2550/308* (2013.01); *B60W 2720/106* (2013.01); *B60W 2750/308* (2013.01)

(58) Field of Classification Search
CPC ............... B60W 30/162; B60W 30/12; B60W 2720/106; B60W 2750/308; B60W 2550/308; G08G 1/017; G05D 1/0223; G05D 1/0221; G05D 1/0088
See application file for complete search history.

(56) References Cited

U.S. PATENT DOCUMENTS

| | | |
|---|---|---|
| 8,676,466 B2 | 3/2014 | Mudalige |
| 8,788,113 B2 | 7/2014 | Filev et al. |
| 8,965,621 B1 | 2/2015 | Urmson et al. |

(Continued)

*Primary Examiner* — Anne M Antonucci
(74) *Attorney, Agent, or Firm* — Dinsmore & Shohl LLP

(57) ABSTRACT

An adaptive vehicle control system that includes processors, memory modules communicatively coupled to the processors, and machine readable instructions stored in the one or more memory modules that cause the adaptive vehicle control system to determine an autonomous operation profile of a target vehicle positioned in a vehicle operating environment, wherein the vehicle operating environment includes a roadway having one or more lanes, determine an autonomous operation profile of one of more neighboring vehicles positioned within the vehicle operating environment, compare the autonomous operation profile of at least one of the one or more neighboring vehicles with the autonomous operation profile of the target vehicle, and alter a condition of the target vehicle such that the autonomous operation profile of the target vehicle matches an autonomous operation profile of an individual neighboring vehicle of the one or more neighboring vehicles positioned in the same lane as the target vehicle.

16 Claims, 4 Drawing Sheets

(56) References Cited

U.S. PATENT DOCUMENTS

| | | | |
|---|---|---|---|
| 2010/0256836 A1* | 10/2010 | Mudalige | G08G 1/163 701/2 |
| 2015/0149017 A1 | 5/2015 | Attard et al. | |
| 2015/0166069 A1 | 6/2015 | Engelman et al. | |

* cited by examiner

ADAPTIVE VEHICLE CONTROL SYSTEMS AND METHODS OF ALTERING A CONDITION OF A VEHICLE USING THE SAME

TECHNICAL FIELD

Embodiments described herein generally relate to adaptive vehicle control systems and, more specifically, methods and systems for altering an autonomous operation of a vehicle using adaptive vehicle control systems.

BACKGROUND

Adaptive cruise control in vehicles automatically adjusts the vehicle speed to maintain a certain distance from vehicles ahead. In current adaptive cruise control systems, the driver has limited control over how the vehicle accelerates or decelerates.

Accordingly, a need exists for systems and methods for altering and customizing autonomous operations of a vehicle using an adaptive cruise control system.

SUMMARY

In one embodiment, an adaptive vehicle control system includes one or more processors, one or more memory modules communicatively coupled to the one or more processors, and machine readable instructions stored in the one or more memory modules that cause the adaptive vehicle control system to perform at least the following when executed by the one or more processors: determine an autonomous operation profile of a target vehicle positioned in a vehicle operating environment, wherein the vehicle operating environment includes a roadway having one or more lanes, determine an autonomous operation profile of one of more neighboring vehicles positioned within the vehicle operating environment, compare the autonomous operation profile of at least one of the one or more neighboring vehicles with the autonomous operation profile of the target vehicle, and alter a condition of the target vehicle such that the autonomous operation profile of the target vehicle matches an autonomous operation profile of an individual neighboring vehicle of the one or more neighboring vehicles positioned in the same lane as the target vehicle.

In another embodiment, a method of altering a condition of a target vehicle including an autonomous operation profile includes determining an autonomous operation profile of a neighboring vehicle positioned within a vehicle operating environment. The vehicle operating environment includes a roadway having one or more lanes. The target vehicle is positioned in a first lane of the one or more lanes. Further, the neighboring vehicle is positioned in the first lane of the one or more lanes. The method further includes comparing the autonomous operation profile of the target vehicle with the autonomous operation profile of the neighboring vehicle and altering the autonomous operation profile of the target vehicle to match the autonomous operation profile of the neighboring vehicle.

In yet another embodiment a method of altering a condition of a target vehicle including an autonomous operation profile includes determining an autonomous operation profile of a first neighboring vehicle and an autonomous operation profile of a second neighboring vehicle. The target vehicle, the first neighboring vehicle, and the second neighboring vehicle are each positioned in a vehicle operating environment comprising a roadway having one or more lanes. The target vehicle is positioned in a first lane of the one or more lanes. The first neighboring vehicle is positioned in the first lane of the one or more lanes. Further, the second neighboring vehicle is positioned in a second lane of the one or more lanes. The method further includes comparing the autonomous operation profile of the target vehicle with the autonomous operation profiles of the first neighboring vehicle and the second neighboring vehicle and providing a control signal to a vehicle control system of the target vehicle, using an automated drive controller, such that the target vehicle moves from the first lane to the second lane when the autonomous operation profile of the target vehicle matches the autonomous operation profile of the second neighboring vehicle and is different than the autonomous operation profile of the first neighboring vehicle.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein include an adaptive vehicle control system for one or more vehicles. The one or more vehicles may include automated drive controllers for providing one or more vehicle control signals to a vehicle control system to control the acceleration, speed, and/or direction of travel of the one or more vehicles. The vehicle control signals may be based on an autonomous operation profile, which includes vehicle control settings that control the instructional content of at least some of the vehicle control signals output by the automated drive controller and received by the vehicle control system. Further, the embodiments disclosed herein include methods of altering the operation of a vehicle traveling on a roadway such that the autonomous operation profile of the vehicle matches the autonomous operation profile of a neighboring vehicle positioned ahead of the vehicle. It may be desirable for the vehicle to follow the neighboring vehicle having the same autonomous operation profile. For example, when the vehicle and the neighboring vehicle have the same autonomous operation profile, they may accelerate and decelerate at the same rates, which may reduce the need to brake the vehicle due to the neighboring vehicle, providing a smoother, more efficient ride. The adaptive vehicle control system and will now be described in more detail herein with specific reference to the corresponding drawings.

Figure 1:
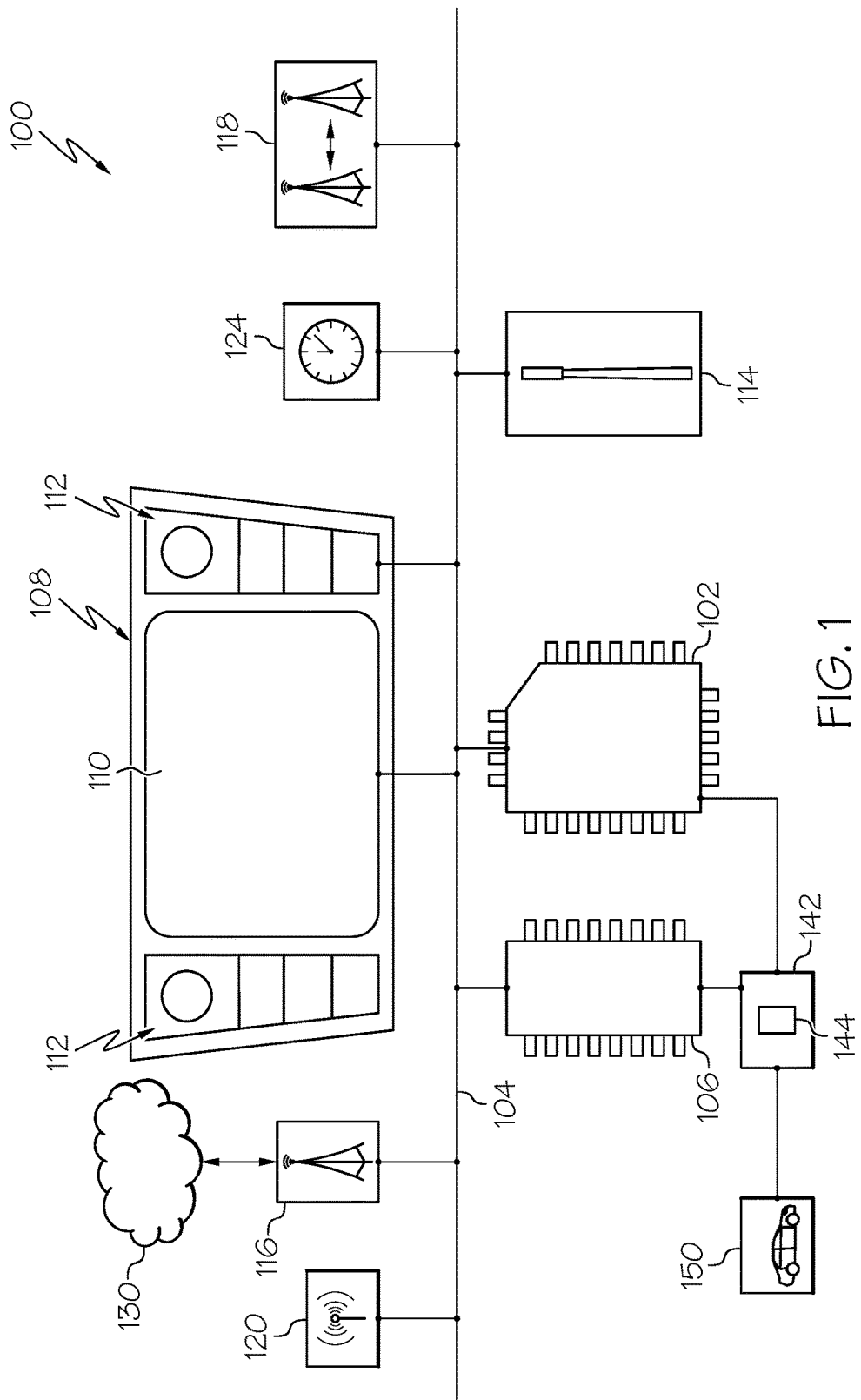
FIG. 1 schematically depicts an adaptive vehicle control system, according to one or more embodiments shown and described herein.
Figure 2:
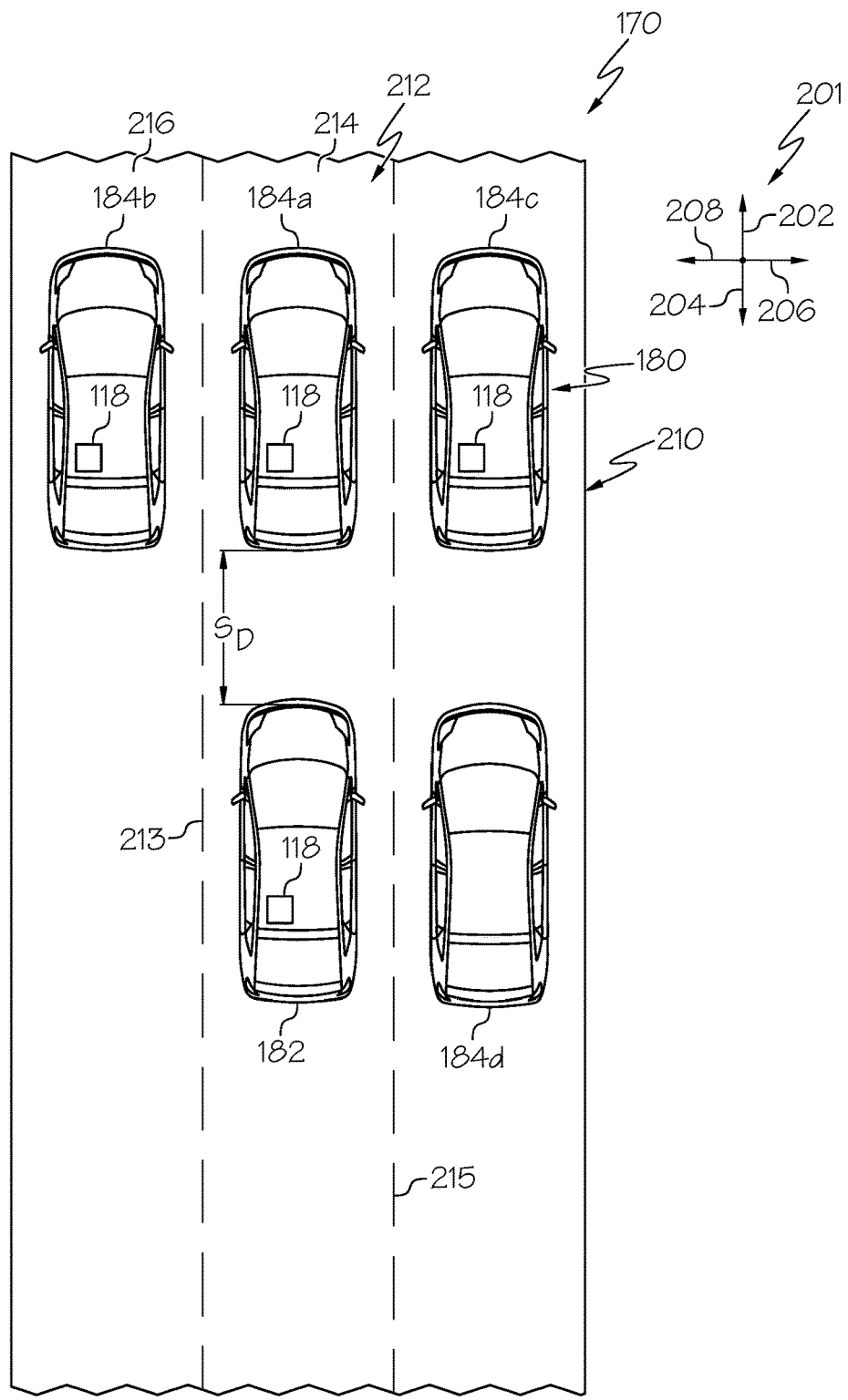
FIG. 2 schematically depicts an example vehicle operating environment including a plurality of vehicles, according to one or more embodiments shown and described herein.

Referring now to FIG. 1, an embodiment of an adaptive vehicle control system 100 is schematically depicted. It is noted that, while the adaptive vehicle control system 100 is depicted in isolation, some or all of the components of the adaptive vehicle control system 100 may be included within one or more vehicles 180, for example, a target vehicle 182 and/or a plurality of neighboring vehicles 184, as depicted in FIG. 2. As depicted in FIG. 1, the adaptive vehicle control system 100 includes one or more processors 102. Each of the one or more processors 102 may be any device capable of executing machine readable instructions. Accordingly, each of the one or more processors 102 may be a controller, an integrated circuit, a microchip, a computer, or any other computing device. The one or more processors 102 are coupled to a communication path 104 that provides signal interconnectivity between various components of the adaptive vehicle control system 100. Accordingly, the communication path 104 may communicatively couple any number of processors 102 with one another, and allow the components coupled to the communication path 104 to operate in a distributed computing environment. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 104 may be formed from any medium that is capable of transmitting a signal such as, for example, conductive wires, conductive traces, optical waveguides, or the like. In some embodiments, the communication path 104 may facilitate the transmission of wireless signals, such as WiFi, Bluetooth, and the like. Moreover, the communication path 104 may be formed from a combination of mediums capable of transmitting signals. In one embodiment, the communication path 104 comprises a combination of conductive traces, conductive wires, connectors, and buses that cooperate to permit the transmission of electrical data signals to components such as processors, memories, sensors, input devices, output devices, and communication devices. Accordingly, the communication path 104 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

Moreover, the adaptive vehicle control system 100 includes one or more memory modules 106 coupled to the communication path 104. The one or more memory modules 106 may comprise RAM, ROM, flash memories, hard drives, or any device capable of storing machine readable instructions such that the machine readable instructions can be accessed by the one or more processors 102. The machine readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules 106. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Referring still to FIG. 1, the adaptive vehicle control system 100 comprises a human machine interface (HMI) 108 communicatively coupled to the communication path 104 and comprising a display 110 and tactile input hardware 112. The HMI 108 is coupled to the communication path 104. Further, the HMI 108 may be located within the one or more vehicles 180. The display 110 of the HMI 108 provides visual output such as, for example, selection tools 115 (FIG. 4) maps, navigation, entertainment, autonomous operation information, or a combination thereof. The display 110 may include any medium capable of transmitting an optical output such as, for example, a cathode ray tube, light emitting diodes, a liquid crystal display, a plasma display, or the like. Moreover, the display 110 may be a touchscreen that, in addition to providing optical information, detects the presence and location of a tactile input upon a surface of or adjacent to the display. Accordingly, the display 110 may receive mechanical input directly upon the optical output provided by the display.

The tactile input hardware 112 may be any device capable of transforming mechanical, optical, or electrical signals into a data signal capable of being transmitted with the communication path 104. Specifically, the tactile input hardware 112 may include any number of movable objects that each transform physical motion into a data signal that can be transmitted to over the communication path 104 such as, for example, a button, a switch, a knob, a microphone, or the like. While the display 110 and the tactile input hardware 112 are described as components of the HMI 108, it is noted that, in some embodiments, the display 110 and the tactile input hardware 112 may be separate from one another and operate as a single module by exchanging signals via the communication path 104.

As depicted in FIG. 1, the adaptive vehicle control system 100 may further comprise a satellite antenna 114 coupled to the communication path 104 and configured to receive signals from global positioning system satellites. For example, the satellite antenna 114 may include one or more conductive elements that interact with electromagnetic signals transmitted by global positioning system satellites. The received signal is transformed into a data signal indicative of the location (e.g., latitude and longitude) of the satellite antenna 114 or an object positioned near the satellite antenna 114, by the one or more processors 102. For example, in some embodiments, the one or more vehicles 180 may comprise the satellite antenna 114 such that the satellite antenna 114 may receive data indicative of the location of the vehicle 180. In some embodiments, the adaptive vehicle control system 100 may be able to determine the distance between an individual vehicle 180 and one or more lane boundaries 213, 215 of one or more lanes 212 (FIG. 2) using the data indicative of the location of the individual vehicle 180 received by the satellite antenna 114.

Moreover, the adaptive vehicle control system 100 may comprise a clock 124 coupled to the communication path 104. The clock 124 may provide time of day signals and calendar signals (e.g., month/day/year data, day of the week data, holiday data, or the like) to the processors 102 and other components of the adaptive vehicle control system 100. As described below, the adaptive vehicle control system 100 may operate differently on different days, and/or at different times of a day.

Still referring to FIG. 1, in some embodiments, the adaptive vehicle control system 100 includes a network 130, for example, one or more computer networks (e.g., a personal area network, a local area network, or a wide area network), cellular networks, satellite networks and/or a global positioning system and combinations thereof. Example local area networks may include wired Ethernet and/or wireless technologies such as, for example, wireless fidelity (Wi-Fi). Moreover, example personal area networks may include wireless technologies such as, for example, IrDA, Bluetooth, Wireless USB, Z-Wave, ZigBee, and/or other near field communication protocols, and/or wired computer buses such as, for example, USB and FireWire. Suitable cellular networks include, but are not limited to, technologies such as LTE, WiMAX, UMTS, CDMA, and GSM.

Still referring to FIG. 1, the adaptive vehicle control system 100 comprises network interface hardware 116 for communicatively coupling the adaptive vehicle control system 100 to the network 130. The network interface hardware 116 can be communicatively coupled to the communication path 104 and can be any device capable of transmitting and/or receiving data via a network. Accordingly, the network interface hardware 116 can include a communication transceiver for sending and/or receiving any wired or wireless communication. For example, the network interface hardware 116 may include an antenna, a modem, LAN port, Wi-Fi card, WiMax card, mobile communications hardware, near-field communication hardware, satellite communication hardware, hardware configured to operate in accordance with the Bluetooth wireless communication protocol, and/or any wired or wireless hardware for communicating with other networks and/or devices.

Still referring to FIG. 1, the adaptive vehicle control system 100 may comprise direct communications hardware 118. Direct communications hardware 118 may be positioned on or in the one or more vehicles 180, for example, on both the target vehicle 182 and at least one of the one or more neighboring vehicles 184, as depicted in FIG. 2, facilitating direct communication between the target vehicle 182 and the one or more neighboring vehicles 184. The direct communications hardware 118 may comprise vehicle to vehicle communications hardware (V2V), vehicle to infrastructure communications hardware (V2X), near field communications (NFC) hardware, such as high frequency NFC, radio-frequency identification (RFID) hardware, or the like.

Still referring to FIG. 1, the adaptive vehicle control system 100 may further comprise a one or more proximity sensors 120 communicatively coupled to the communication path 104. The one or more proximity sensors 120 may be any device capable of outputting a proximity signal indicative of a proximity of an object to the proximity sensor 120. For example, the one or more proximity sensors 120 include a camera, a laser scanner, a capacitive displacement sensor, a Doppler effect sensor, an eddy-current sensor, an ultrasonic sensor, a magnetic sensor, an optical sensor, a radar sensor, a sonar sensor, a lidar sensor, or the like.

In some embodiments, the one or more proximity sensors 120 may be positioned on or in the one or more vehicles 180, for example, the target vehicle 182 and, in operation, may be able to detect the presence of one or more neighboring vehicles 184 and detect the relative distance, relative speed, and/or the relative acceleration between the target vehicle 182 and the one or more neighboring vehicles 184. Further, the one or more proximity sensors 120 may determine the distance between the target vehicle 182 and one or more lane boundaries 213, 215 of one or more lanes 212, as depicted in FIG. 2, such that, in an autonomous operation, the one or more vehicles 180 may perform a lane tracking operation using the one or more proximity sensors 120 to remain between the lane boundaries 213, 215 while traversing an individual lane 212. Moreover, the one or more proximity sensors 120 may determine in which lane 212 each of the one or more neighboring vehicles 184 is positioned. In some embodiments, the adaptive vehicle control system 100 may be able to determine the location of the vehicle 180, for example, the target vehicle 182 based on a proximity signal outputted by the proximity sensor 120 and in embodiments in which the one or more proximity sensors 120 comprise a camera, the adaptive vehicle control system 100 may be able to determine a location of the vehicle 180, for example, the target vehicle 182, by accessing geotagged data.

Referring now to FIG. 2, an example vehicle operating environment 170 is depicted. The vehicle operating environment 170 depicted in FIG. 2 provides illustrative context for the various functions of the adaptive vehicle control system 100, described below. The vehicle operating environment 170 includes a roadway 210 having one or more lanes 212, for example, a first lane 214 (e.g., a center lane), a second lane 216 (e.g., a left lane), and a third lane 218 (e.g., a right lane). Further, the roadway 210 comprises one or more lane boundaries, for example, a first lane boundary 213 positioned between the first lane 214 and the second lane 216 and a second lane boundary 215 positioned between the first lane 214 and the third lane 218. While three lanes 212 are depicted in the roadway 210 of FIG. 2, it should be understood that the roadway 210 may comprise any number of lanes 212. For ease of understanding the vehicle operating environment 170 depicted in FIG. 2, an example coordinate system 201 is depicted. The example coordinate system 201 includes a vehicle forward direction 202, a vehicle reverse direction 204, a vehicle rightward direction 206, and a vehicle leftward direction 208.

In the embodiment of the vehicle operating environment 170 depicted in FIG. 2, the one or more vehicles 180 are depicted, including the target vehicle 182 and the one or more neighboring vehicles 184, which may comprise an automobile or any other passenger or non-passenger vehicle. In some embodiments, the plurality of vehicles 180 may comprise autonomous vehicles that navigate their environment with limited human input or without human input. The target vehicle 182 and the one or more neighboring vehicles 184 comprise a frame, one or more wheels, and a vehicle control system 150 that may include an engine system, steering system, transmission system, braking system, and any other components for controlling the acceleration, deceleration, speed, and/or direction of travel of the target vehicle 182 and the one or more neighboring vehicles 184.

As depicted in FIG. 2, the target vehicle 182 is positioned in the first lane 214 and the plurality of neighboring vehicles 184 are positioned in each of the first lane 214, the second lane 216, and the third lane 218. For example, a first neighboring vehicle 184*a* is positioned in the first lane 214 and positioned ahead of the target vehicle 182 in the vehicle forward direction 202. A second neighboring vehicle 184*b* is positioned in the second lane 216 and positioned ahead of the target vehicle 182 in the vehicle forward direction 202. A third neighboring vehicle 184*c* is positioned in the third lane 218 and positioned ahead of the target vehicle 182 in the vehicle forward direction 202. Further, a fourth neighboring vehicle 184d is positioned in the third lane 218 and positioned adjacent the target vehicle 182 in the vehicle rightward direction 206. The fourth neighboring vehicle 184d is positioned such that the fourth neighboring vehicle 184d would impede the movement of the target vehicle 182 from the first lane 214 into the third lane 218. Moreover, as depicted in FIG. 2, the target vehicle 182, the first neighboring vehicle 184a, the second neighboring vehicle 184b, and the third neighboring vehicle 184c each include direct communications hardware 118, allowing direct communication between each of these vehicles.

Referring still to FIGS. 1 and 2, the one or more vehicles 180, for example, the target vehicle 182 and the one or more neighboring vehicles 184 may comprise an automated drive controller 142 communicatively coupled to the vehicle control system 150. In operation, the automated drive controller 142 provides one or more vehicle control signals to the vehicle control system 150 to control the acceleration, speed, and/or direction of travel of the vehicle 180 (e.g., the target vehicle 182 and/or the one or more neighboring vehicles 184) by controlling one or more systems of the vehicle control system 150, such as the engine system, steering system, transmission system, braking system, or the like.

In some embodiments, the automated drive controller 142 is component of the target vehicle 182 and/or the one or more neighboring vehicles 184. In other embodiments, the automated drive controller 142 is positioned apart from the target vehicle 182 and/or the one or more neighboring vehicles 184 and is communicatively coupled to the vehicle control system 150 of the target vehicle 182 and/or the one or more neighboring vehicles 184 using a wireless connection. Further, the automated drive controller 142 may be communicatively coupled to the one or more processors 102 and the one or more memory modules 106 and, in some embodiments; may include at least one of the one or more processors 102 and at least one of the one or more memory modules 106. Moreover, the automated drive controller 142 may operate as an adaptive cruise control system that outputs vehicle control signals to the vehicle control system 150, such that the vehicle control system 150 automatically adjusts the speed of the vehicle 180 (for example, the target vehicle 182) to maintain a separation distance $S_D$ between the target vehicle 182 and another vehicle 180. For example, an individual neighboring vehicle 184 located ahead of the target vehicle 182 in the vehicle forward direction 202 and in the same lane 212 as the target vehicle 182.

Figure 3A:
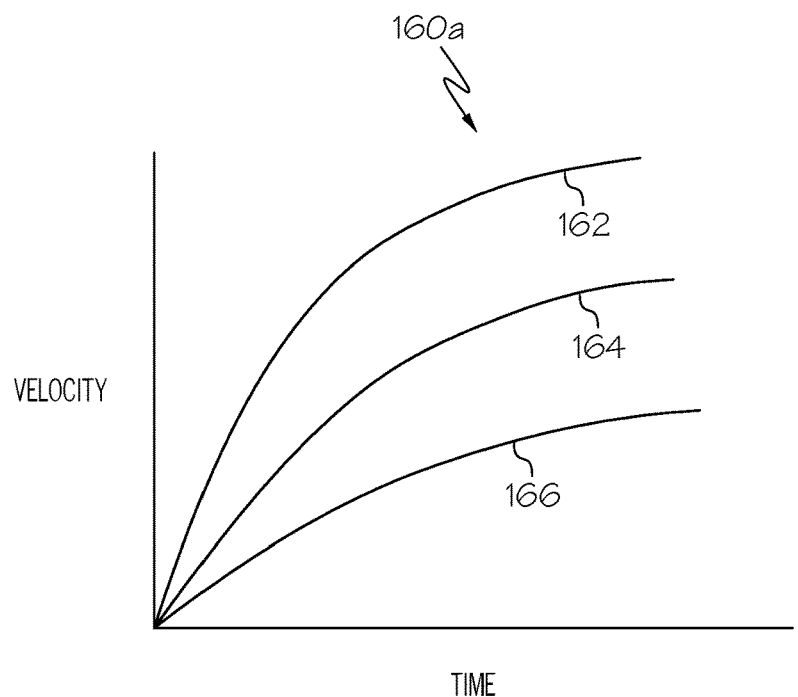
FIG. 3A graphically depicts example autonomous acceleration operation profile of the adaptive vehicle control system of FIG. 1, according to one or more embodiments shown and described herein.
Figure 3B:
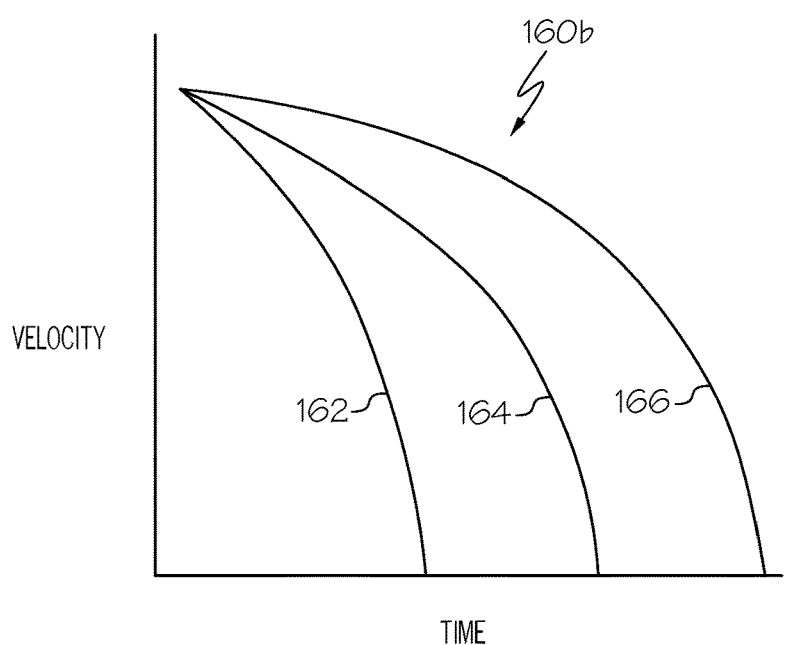
FIG. 3B graphically depicts example autonomous deceleration operation profile of the adaptive vehicle control system of FIG. 1, according to one or more embodiments shown and described herein.

In operation, the automated drive controller 142 may output one or more vehicle control signals to the vehicle control system 150. The one or more vehicle control signals of the automated drive controller 142 comprise an acceleration control signal which includes instructions regarding a desired acceleration rate of the vehicle 180 and a deceleration control signal which includes instructions regarding a desired deceleration rate of the vehicle 180. Further, the vehicle control signals may be based on an autonomous operation profile 160 (FIGS. 3A and 3B). While the autonomous operation profile 160 is primarily described herein with respect to the target vehicle 182, it should be understood that the one or more neighboring vehicles 184 may also comprise vehicle control systems 150 communicatively coupled to an automated drive controller 142 configured to control the one or more neighboring vehicles 184 based on the autonomous operation profile 160.

The autonomous operation profile 160 comprises vehicle control settings that control the instructional content of at least some of the vehicle control signals output by the automated drive controller 142 and received by the vehicle control system 150. For example, the autonomous operation profile 160 may comprise vehicle control settings specifying the acceleration rate or acceleration operation profile and the deceleration rate or deceleration operation profile that the vehicle control signals output by the automated drive controller 142 instruct the vehicle control system 150 to implement. In some embodiments, when the automated drive controller 142 operates as an adaptive cruise control system, the autonomous operation profile 160 specifies the instructions provided by the vehicle control signals of the automated drive controller 142 to the vehicle control system 150 to control the acceleration rate and the deceleration rate of the target vehicle 182, as the target vehicle 182 maintains the separation distance $S_D$ from the individual neighboring vehicles 184. For example, as the target vehicle 182 maintains the separation distance $S_D$ from the first neighboring vehicle 184a positioned ahead of the target vehicle 182 in the vehicle forward direction 202 as depicted in FIG. 2.

Referring now to FIGS. 3A and 3B, the adaptive vehicle control system 100 may comprise multiple autonomous operation profiles 160, each comprising different vehicle control settings. For example, an aggressive autonomous operation profile 162, a normal autonomous operation profile 164, and a relaxed autonomous operation profile 166. In operation, the aggressive autonomous operation profile 162 comprises vehicle control settings specifying an aggressive acceleration rate and an aggressive deceleration rate, the normal autonomous operation profile 164 comprises vehicle control settings specifying a normal acceleration rate and a normal deceleration rate, and the relaxed autonomous operation profile 166 comprises vehicle control settings specifying a relaxed acceleration rate and a relaxed deceleration rate. As graphically depicted in FIG. 3A, a magnitude of the normal acceleration rate is less than a magnitude of the aggressive acceleration rate and greater than a magnitude of the relaxed acceleration rate. Moreover, as graphically depicted in FIG. 3B, a magnitude of the normal deceleration rate is less than a magnitude of the aggressive deceleration rate and greater than a magnitude of the relaxed deceleration rate.

Referring still to FIGS. 3A and 3B, the autonomous operation profile 160 may include an autonomous acceleration operation profile 160a (FIG. 3A) comprising vehicle control settings regarding acceleration and an autonomous deceleration operation profiles 160b (FIG. 3B) comprising vehicle control settings regarding deceleration. In operation, the autonomous acceleration operation profile 160a may be different than the autonomous deceleration operation profile 160b, for example, the autonomous acceleration operation profile 160a may be an aggressive autonomous operation profile 162 and the autonomous deceleration operation profile 160b may be a normal autonomous operation profile 164. Further, a single autonomous operation profile 160 may control both the acceleration and deceleration of the target vehicle 182.

Referring now to FIGS. 1-4, the autonomous operation profile 160 may be correlated with the vehicle operating environment 170 of the target vehicle 182. For example, the vehicle operating environment 170 may comprise a highway environment 172, a surface street environment 174, or a high traffic environment 176. In some embodiments, the one or more autonomous operation profiles 160 comprise a first autonomous operation profile corresponding with a first vehicle operating environment and a second autonomous operation profile corresponding with a second vehicle operating environment. As one non-limiting example, when the target vehicle 182 is positioned in the highway environment 172, the automated drive controller 142 may output vehicle control signals according to the aggressive autonomous operation profile 162 and when the target vehicle 182 is positioned in the surface street environment 174, the automated drive controller 142 may output vehicle control signals according to the normal autonomous operation profile 164.

The highway environment 172 and the surface street environment 174 each depend on the location of the target vehicle 182, e.g., a highway or a surface street. In operation, the adaptive vehicle control system 100 may determine whether the target vehicle 182 is in the highway environment 172 or the surface street environment 174 based on location data, which may be stored in the memory modules 106, determined based on location signals received by the satellite antenna 114, determined based on sensor data measured by the proximity sensors 120, or determined using any other known or yet to be developed location determination methods. Further, it should be understood that the highway environment 172 and the surface street environment 174 are merely example vehicle operating environments 170 and the autonomous operation profile 160 may be correlated with any number of vehicle operating environments 170, for example, urban environments, rural environments, or the like.

Moreover, the high traffic environment 176 is dependent on the number of neighboring vehicles 184 on the same roadway 210 as the target vehicle 182. In some embodiments, the adaptive vehicle control system 100 may determine if the target vehicle 182 is located in the high traffic environment 176 based on access to real time traffic information, which may be located on one or more servers or databases communicatively coupled to the network 130 and may be accessed using the network interface hardware 116. In some embodiments, the adaptive vehicle control system 100 may determine if the target vehicle 182 is located in the high traffic environment 176 based on historical traffic data, which may be stored in the one or more memory modules 106 or located on one or more servers or databases communicatively coupled to the network 130. Further, the adaptive vehicle control system 100 may determine if the target vehicle 182 is located in the high traffic environment 176 based on sensor data measured by the proximity sensors 120 and/or based on the frequency of braking by the target vehicle 182. In some embodiments, if the autonomous operation profile 160 corresponding to the high traffic environment 176 is different than the autonomous operation profile 160 for the highway environment 172 or the surface street environment 174, the autonomous operation profile 160 for the high traffic environment 176 may supersede the autonomous operation profiles 160 for the highway environment 172 or the surface street environment 174 such that, in the high traffic environment 176, the autonomous operation profile 160 corresponding to the high traffic environment 176 is implemented.

Referring still to FIGS. 1-4, the autonomous operation profile 160 may be time specific, for example, the autonomous operation profile 160 may change depending on the specific day, specific time of day, or the like. The time may be determined by the clock 124 communicatively coupled to the automated drive controller 142. For example, the automated drive controller 142 may output vehicle control signals according to a different autonomous operation profile during a workweek (e.g., Monday through Friday) than during a weekend (e.g., Saturday and Sunday). For example, the one or more autonomous operation profiles 160 may comprise a first autonomous operation profile corresponding with a weekend date and a second autonomous operation profile with a weekday date. As one non-limiting example, the autonomous operation profile 160 may comprise the aggressive autonomous operation profile 162 during the workweek and the relaxed autonomous operation profile 166 during the weekend.

Moreover, the autonomous operation profile 160 may depend on a combination of factors, for example, the time and the vehicle operating environment 170. As one non-limiting example, during the workweek, the autonomous operation profile 160 may be set as the aggressive autonomous operation profile 162 when the target vehicle 182 is positioned in any vehicle operating environment 170 and, during the weekend, the autonomous operation profile 160 may be the aggressive autonomous operation profile 162 when the target vehicle 182 is positioned in the highway environment 172 and may be the relaxed autonomous operation profile 166 when the target vehicle 182 is positioned in the surface street environment 174. It should be understood that any combination of autonomous operation profiles 160 may be implemented based on the locations of the target vehicle 182, the specific operation of the target vehicle 182 (e.g., acceleration or deceleration), the time, as well as weather conditions and other external factors.

Figure 4:
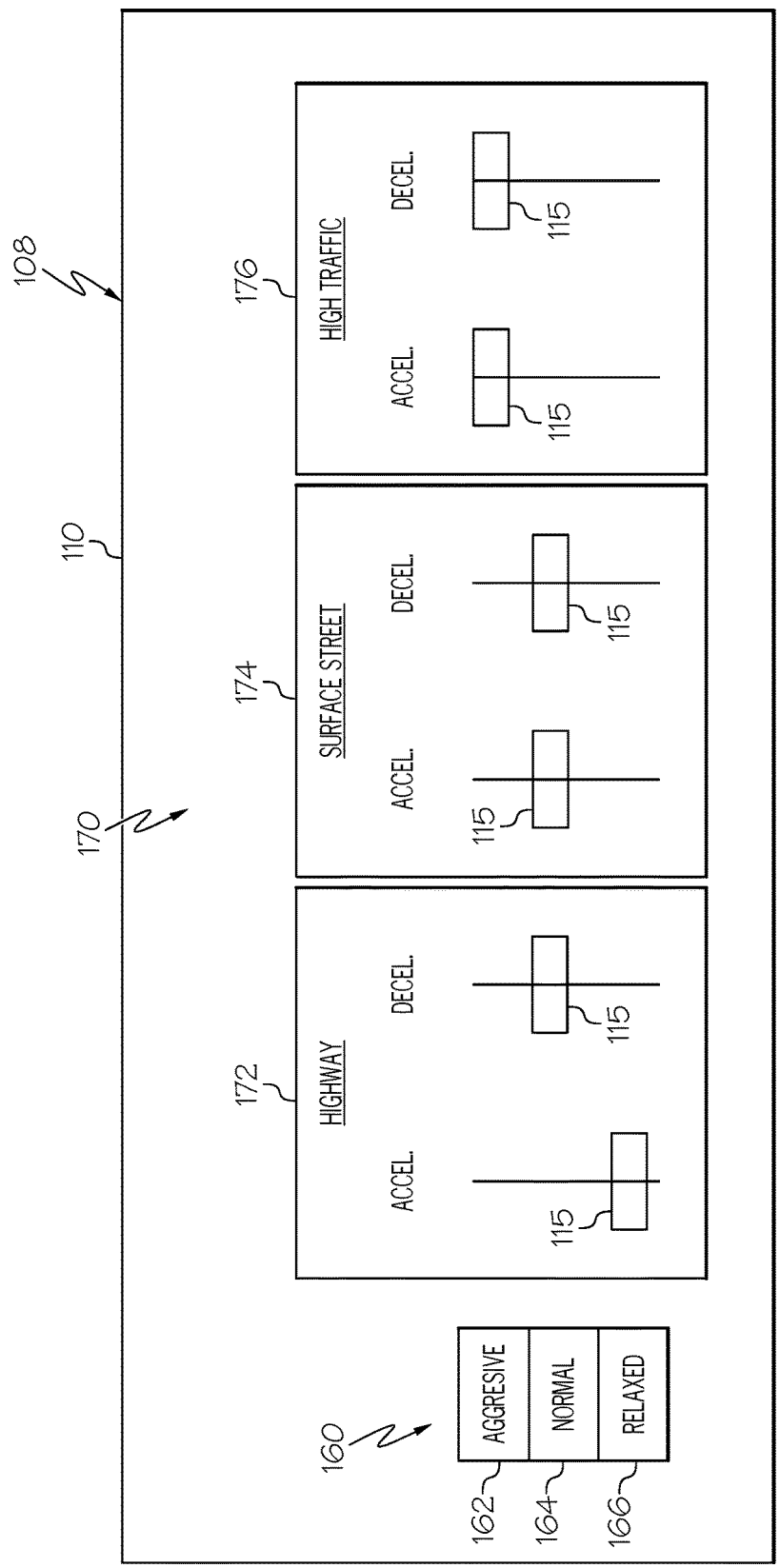
FIG. 4 schematically depicts an example human machine interface of the adaptive vehicle control system, according to one or more embodiments shown and described herein.

Referring still to FIGS. 1-4, the one or more autonomous operation profiles 160 may be customizable, for example, based on user input. FIG. 4 depicts the display 110 of the HMI 108, which may display the one or more selection tools 115 for receiving user input regarding the autonomous operation profiles 160. As depicted in FIG. 4, the one or more autonomous operation profiles 160 may be customized for different vehicle operating environments 170, for example, the highway environment 172, the surface street environment 174, and the high traffic environment 176 and for both acceleration and deceleration. The selection tools 115 allow the user to select preset autonomous operation profiles 160 and allow the user to select a custom autonomous operation profile 160 between the preset autonomous operation profiles 160, for example, between the aggressive autonomous operation profile 162 and the normal autonomous operation profile 164 or between the normal autonomous operation profile 164 and the relaxed autonomous operation profile 166.

The automated drive controller 142 may further comprise a learning module 144 that allows the automated drive controller 142 to monitor the operation of the target vehicle 182 to determine the user's preferred driving style and match the user's preferred driving style with the autonomous operation profile 160 that corresponds with the user's preferred driving style. For example, the user may select the aggressive autonomous operation profile 162 but, when operating the target vehicle 182, may repeatedly override the aggressive autonomous operation profile 162 by manually slowing (e.g., braking) the target vehicle 182. In some embodiments, if the user repeatedly overrides the selected autonomous operation profile 160, the automated drive controller 142 may determine that the user's preferred driving style is different than the selected autonomous operation profile 160. In some embodiments, the automated drive controller 142 may apply the autonomous operation profile 160 corresponding with the user's preferred driving style automatically or may prompt the user to input, for example, on the display 110, whether he or she would like to implement the autonomous operation profile 160 corresponding with the user's preferred driving style settings, as determined by the learning module 144 of the automated drive controller 142

Referring again to FIGS. 1-4, the adaptive vehicle control system 100 may implement a method of altering a condition of the target vehicle 182 based on the autonomous operation profile 160 of the target vehicle 182 and the autonomous operation profile 160 of the one or more neighboring vehicles 184. In some embodiments, the method may be implemented as logic within the machine readable instructions that, when executed by the one or more processors 102, automatically provides vehicle function instruction. It is noted that, while the method is described as following a specific sequence, additional embodiments of the present disclosure are not limited to any particular sequence.

The method of altering a condition of the target vehicle 182 first comprises determining the autonomous operation profile 160 of the target vehicle 182 and the autonomous operation profile 160 of one of more neighboring vehicles 184, each positioned within the vehicle operating environment 170. As one non-limiting example, the target vehicle 182 may determine the autonomous operation profile 160 of the one or more neighboring vehicles 184 based on a signal output by the direct communications hardware 118 of the one or more neighboring vehicles 184 and received by the direct communications hardware 118 of the target vehicle 182. As another non-limiting example, one or more proximity sensors 120 of the target vehicle 182 may monitor the operation of the one or more neighboring vehicles 184 (e.g., measure the relative distance, relative speed, and/or the relative acceleration between the target vehicle 182 and the one or more neighboring vehicles 184 over a period of time). Based on this sensor data measured by the one or more proximity sensors 120, the one or more processors 102 communicatively coupled to the one or more proximity sensors 120 may determine, or at least estimate, the autonomous operation profile 160 of the one or more neighboring vehicles 184.

Next, the adaptive vehicle control system 100 may compare the autonomous operation profile 160 of each of the one of more neighboring vehicles 184 with the autonomous operation profile 160 of the target vehicle 182. In particular, the adaptive vehicle control system 100 may determine if the autonomous operation profiles 160 of any of the one or more neighboring vehicles 184 comprise the same autonomous operation profile 160 as the target vehicle 182. Further, the adaptive vehicle control system 100 may next alter the target vehicle 182 such that the autonomous operation profile 160 of the target vehicle 182 matches the autonomous operation profile 160 of an individual neighboring vehicle 184 positioned in the same lane as the target vehicle 182. It may be desirable for the target vehicle 182 to follow the neighboring vehicle 184 having the same autonomous operation profile 160. When the target vehicle 182 and the neighboring vehicle 184 have the same autonomous operation profile 160, they may accelerate and decelerate at the same rates, which may reduce the need to brake the target vehicle 182 due to the neighboring vehicle 184, providing a smoother, more efficient ride.

In some embodiments, altering the target vehicle 182 may comprise changing the autonomous operation profile 160 of the target vehicle 182 to match the autonomous operation profile 160 of the individual neighboring vehicle 184 positioned in the same lane as the target vehicle 182, for example, positioned ahead of the target vehicle 182 in the vehicle forward direction 202. As depicted in FIG. 2, the target vehicle 182 may be positioned in the first lane 214 and the first neighboring vehicle 184a may also be positioned in the first lane 214, ahead of the target vehicle 182 in the vehicle forward direction 202. If the autonomous operation profile 160 of the target vehicle 182 does not match the autonomous operation profile 160 of the first neighboring vehicle 184a, the adaptive vehicle control system 100, for example, the automated drive controller 142, may alter the autonomous operation profile 160 of the target vehicle 182 to match the autonomous operation profile 160 of the autonomous operation profile 160 of the first neighboring vehicle 184a.

In other embodiments, altering the target vehicle 182 may comprise altering the position of the target vehicle 182, for example, by changing the lane 212 in which the target vehicle 182 is located. As depicted in FIG. 2, the target vehicle 182 may be positioned in the first lane 214 and the first neighboring vehicle 184a may also be positioned in the first lane 214 ahead of the target vehicle 182 in the vehicle forward direction 202. Further, the autonomous operation profile 160 of the target vehicle 182 may be different than the autonomous operation profile 160 of the first neighboring vehicle 184a. In this embodiment, the target vehicle 182 may change lanes 212, either automatically, in response to one or more vehicle control signals output by the automated drive controller 142 and received by the vehicle control system 150, or manually, in response to user input.

In some embodiments, the adaptive vehicle control system 100 compares the autonomous operation profile 160 of the target vehicle 182 with each of the autonomous operation profiles 160 of the neighboring vehicles 184 positioned ahead of the target vehicle 182, for example, the autonomous operation profiles 160 of the first neighboring vehicle 184a positioned in the first lane 214, the second neighboring vehicle 184b positioned in the second lane 216, and the third neighboring vehicle 184c positioned in the third lane 218. Next, the adaptive vehicle control system 100 may determine which of these autonomous operation profiles 160 match the autonomous operation profile 160 of the target vehicle 182.

If the autonomous operation profile 160 of an individual neighboring vehicle 184 matches the autonomous operation profile 160 of the individual neighboring vehicle 184, the automated drive controller 142 may provide a vehicle control signal to the vehicle control system 150 of the target vehicle 182 such that the target vehicle 182 moves into the lane 212 in which the individual neighboring vehicle 184 is positioned. In some embodiments, the target vehicle 182 may move lanes 212 only if the individual neighboring vehicle 184 positioned in the same lane 212 as the target vehicle comprises a different autonomous operation profile 160 than the target vehicle 182 and another individual neighboring vehicle 184 positioned in a different lane 212 than the target vehicle 182 comprises the same autonomous operation profile 160 as the target vehicle 182.

As a non-limiting example, referring to FIG. 2, the target vehicle 182 may comprise the aggressive autonomous operation profile 162, the first neighboring vehicle 184a may comprise the relaxed autonomous operation profile 166, and the second and third neighboring vehicles 184b, 184c may each comprise the aggressive autonomous operation profile 162. In this situation, the automated drive controller 142 may provide a vehicle control signal to the vehicle control system 150 of the target vehicle 182 such that the target vehicle 182 moves into the second lane 216 or the third lane 218, behind the second neighboring vehicle 184b or the third neighboring vehicle 184c.

Further, the one or more proximity sensors 120 of the target vehicle 182 may operate as part of a collision avoidance system of the target vehicle 182, which may inhibit the target vehicle 182 from changing lanes when an individual neighboring vehicle 184 inhibits the lane change. For example, sensor signals of the one or more proximity sensors 120 may be used to determine whether the second lane 216 and the third lane 218 are clear such that movement of the target vehicle from 182 from the first lane 214 into either the second lane 216 of the third lane 218 will not cause contact between the target vehicle 182 and an individual neighboring vehicle 184. As depicted in FIG. 2, the fourth neighboring vehicle 184d is positioned such that the fourth neighboring vehicle 184d would impede the movement of the target vehicle 182 from the first lane 214 into the third lane 218. Accordingly, in the situation depicted in FIG. 2, the target vehicle 182 would move into the second lane 216, behind the second neighboring vehicle 184b.

It should be understood that embodiments described herein provide for adaptive vehicle control systems and methods for altering the operation of a vehicle traveling on a roadway such that an autonomous operation profile of the vehicle matches the autonomous operation profile of a neighboring vehicle positioned ahead of the vehicle. As one example, the adaptive vehicle control system may alter the autonomous operation profile of the vehicle to match the autonomous operation of a neighboring vehicle positioned ahead of the vehicle. As another example, the vehicle may change lanes such that the vehicle is positioned in the same lane as the neighboring vehicle having the same autonomous operation profile as the vehicle. It may be desirable for the vehicle to follow the neighboring vehicle having the same autonomous operation profile. For example, when the vehicle and the neighboring vehicle have the same autonomous operation profile, they may accelerate and decelerate at the same rates, which may reduce the need to brake the vehicle due to the neighboring vehicle, providing a smoother, more efficient ride.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An adaptive vehicle control system comprising:
   one or more processors;
   one or more memory modules communicatively coupled to the one or snore processors; and
   machine readable instructions stored in the one or more memory modules that cause the adaptive vehicle control system to perform at least the following when executed by the one or more processors:
   determine an autonomous operation profile of a target vehicle positioned in a vehicle operating environment, wherein the vehicle operating environment comprises a roadway having one or more lanes;
   determine an autonomous operation profile of one of more neighboring vehicles positioned within the vehicle operating environment;
   compare the autonomous operation profile of at least one of the one or more neighboring vehicles with the autonomous operation profile of the target vehicle; and
   alter a condition of the target vehicle such that the autonomous operation profile of the target vehicle matches an autonomous operation profile of an individual neighboring vehicle of the one or more neighboring vehicles positioned in the same lane as the target vehicle.

2. The adaptive vehicle control system of claim 1, wherein:
   the autonomous operation profile of the target vehicle comprises one or more vehicle control settings for an automated drive controller of the target vehicle; and
   the one or more vehicle control settings of the autonomous operation profile of the target vehicle control an acceleration control signal, a deceleration control signal, or both, that, when output by the automated drive controller of the target vehicle and received by a vehicle control system of the target vehicle, control an acceleration rate of the target vehicle, a deceleration rate of the target vehicle, or both.

3. The adaptive vehicle control system of claim 2, wherein a magnitude of the acceleration rate of the target vehicle is different than a magnitude of the deceleration rate of the target vehicle.

4. The adaptive vehicle control system of claim 2, wherein:
   the autonomous operation profile comprises one of an aggressive autonomous operation profile, a normal autonomous operation profile, and a relaxed autonomous operation profile; and
   a magnitude of the acceleration rate, the deceleration rate, or both, of the target vehicle based on the normal autonomous operation profile is less than a magnitude of the acceleration rate, the deceleration rate, or both, of the target vehicle based on the aggressive autonomous operation profile and is greater than a magnitude of the acceleration rate, the deceleration rate, or both, of the target vehicle based on the relaxed autonomous operation profile.

5. The adaptive vehicle control system of claim 1, wherein the autonomous operation profile of the target vehicle comprises a first autonomous operation profile corresponding with a weekend date and a second autonomous operation profile with a weekday date.

6. The adaptive vehicle control system of claim 1, wherein the autonomous operation profile of the target vehicle comprises a first autonomous operation profile corresponding with a first vehicle operating environment and a second autonomous operation profile corresponding with a second vehicle operating environment.

7. The adaptive vehicle control system of claim 1, wherein:
   the target vehicle is positioned in a first lane;
   the individual neighboring vehicle is positioned in the first lane; and
   altering the condition of the target vehicle comprises altering the autonomous operation profile of the target vehicle to match the autonomous operation profile of the individual neighboring vehicle positioned in the first lane.

8. The adaptive vehicle control system of claim 1, wherein:
   the target vehicle is positioned in a first lane;
   the autonomous operation profile of the target vehicle comprises a first autonomous operation profile;
   the individual neighboring vehicle is positioned in a second lane;

the autonomous operation profile of the individual neighboring vehicle comprises the first autonomous operation profile; and altering the condition of the target vehicle comprises providing a vehicle control signal to a vehicle control system of the target vehicle such that the target vehicle moves from the first lane to the second lane.

9. The adaptive vehicle control system of claim 1, wherein the target vehicle and the individual neighboring vehicle each comprise direct communications hardware.

10. The adaptive vehicle control system of claim 9, wherein the machine readable instructions stored in the one or more memory modules further cause the adaptive vehicle control system to perform at least the following when executed by the one or more processors:

determine the autonomous operation profile of the individual neighboring vehicle based on a signal output by the direct communications hardware of individual neighboring vehicle and received by the direct communications hardware of the target vehicle.

11. The adaptive vehicle control system of claim 1, further comprising one or more proximity sensors communicatively coupled to the one or more processors, wherein the machine readable instructions stored in the one or more memory modules further cause the adaptive vehicle control system to perform at least the following when executed by the one or more processors:

determine a distance between the target vehicle and at least one of the one or more neighboring vehicles.

12. The adaptive vehicle control system of claim 1, further comprising one or more proximity sensors communicatively coupled to the one or more processors, wherein the machine readable instructions stored in the one or more memory modules further cause the adaptive vehicle control system to perform at least the following when executed by the one or more processors:

determine the autonomous operation profile of the one of more neighboring vehicles positioned within the vehicle operating environment based on sensor data measured by the one or more proximity sensors, wherein the sensor data includes relative acceleration between the target vehicle and the one or more neighboring vehicles.

13. A method of altering a condition of a target vehicle comprising an autonomous operation profile, the method comprising:

determining an autonomous operation profile of a neighboring vehicle positioned within a vehicle operating environment, wherein:
the vehicle operating environment comprises a roadway having one or more lanes;
the target vehicle is positioned in a first lane of the one or more lanes; and
the neighboring vehicle is positioned in the first lane of the one or more lanes;

comparing the autonomous operation profile of the target vehicle with the autonomous operation profile of the neighboring vehicle; and altering the autonomous operation profile of the target vehicle to match the autonomous operation profile of the neighboring vehicle.

14. The method of claim 13, wherein the neighboring vehicle is positioned ahead of the target vehicle in a vehicle forward direction.

15. The method of claim 14, further comprising providing a control signal to a vehicle control system of the target vehicle, using an automated drive controller, such that the target vehicle maintains a separation distance between the target vehicle and the neighboring vehicle.

16. The method of claim 13 wherein:
the autonomous operation profile of the target vehicle comprises one or more vehicle control settings for an automated drive controller of the target vehicle; and
the one or more vehicle control settings of the autonomous operation profile of the target vehicle control an acceleration control signal, a deceleration control signal, or both, that, when output by the automated drive controller of the target vehicle and received by a vehicle control system of the target vehicle, control an acceleration rate of the target vehicle, a deceleration rate of the target vehicle, or both.

* * * * *